E. B. Decker's Tire Shrinker.
73170
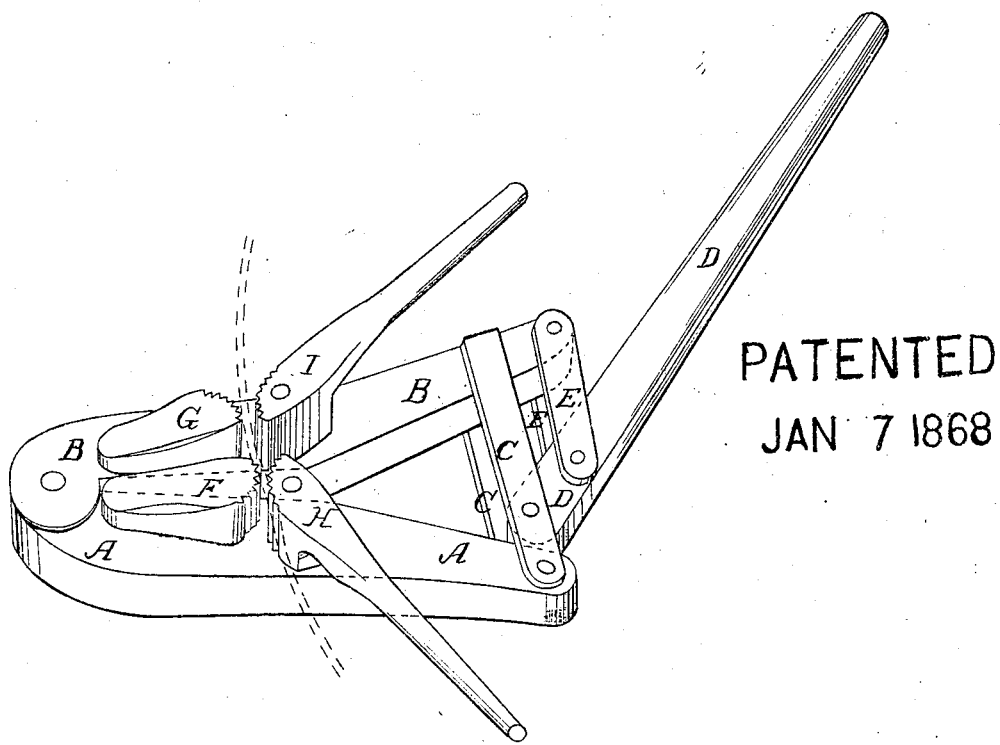
PATENTED
JAN 7 1868

United States Patent Office.

EDWARD B. DECKER, OF BEDFORD, ILLINOIS.

Letters Patent No. 73,170, dated January 7, 1868.

IMPROVED TIRE-SHRINKER.

*The Schedule referred to in these Letters Patent and making part of the same.*

TO ALL WHOM IT MAY CONCERN:

Be it known that I, EDWARD B. DECKER, of Bedford, in the county of Pike, and State of Illinois, have invented a new and improved Tire-Shrinker; and I do hereby declare that the following is a full, clear, and exact description thereof, which will enable those skilled in the art to make and use the same, reference being had to the accompanying drawing, and to the letters of reference marked thereon, forming part of this specification.

The figure is a perspective view of my improved tire-shrinker, opened to receive the tire.

My invention has for its object to furnish an improved machine for shrinking tire, which shall be simple in construction, convenient to be used, and powerful in operation; and it consists in the combination of the operating-lever, pivoting-straps, and pivoted bars or levers, having clamps with stationary and eccentric movable jaws attached to them for grasping the tire, the whole being constructed and arranged as hereinafter more fully described.

A and B are two bars or levers, pivoted to each other at one end, as shown in the drawing. C is a band or strap, the ends of which are pivoted to the opposite sides of the end of the lever or bar A, and which passes around the bar or lever B, which is made a little longer than the lever A. D is the operating-lever or handle, the end of which is pivoted to the strap C near the end of the lever A. E are straps, one end of which is pivoted to the opposite sides of the end of the lever B, and their other ends are pivoted to the opposite sides of the operating-lever or handle D, at a little distance from the strap C. By this arrangement, the ends of the levers A B are drawn together with great power, or forced apart by operating the lever or handle D. F and G are the stationary jaws of the clamps, which are firmly attached to the levers or bars A B, and the forward ends of which are corrugated, or have teeth formed upon them, to enable them to take a firmer hold of the tire. H and I are the movable jaws of the clamps, the forward ends or faces of which are corrugated, or have teeth formed upon them, to enable them to take a firmer hold upon the tire. The jaws H and I are pivoted to the levers A B, and their faces are made eccentric or cam-shaped, so that they may grasp the tire and hold it firmly, whether it be thick or thin. The jaws H and I may be moved back and forth to grasp and release the tire by lever-handles formed upon or attached to their rear sides, or by cross-heads or handles attached to their upper sides.

Having thus described my invention, I claim as new, and desire to secure by Letters Patent—

The combination of the operating-lever or handle D, pivoting-straps C and E, pivoted levers or bars A and B, having clamps with stationary jaws F G, and pivoted eccentric jaws H I attached to them, with each other, substantially as herein shown and described, and for the purpose set forth.

The above specification of my invention signed by me, this 7th day of November, 1867.

EDWARD B. DECKER.

Witnesses:
L. J. FRANK,
ADAM MILLER.